(12) United States Patent
Seo

(10) Patent No.: US 11,775,426 B2
(45) Date of Patent: Oct. 3, 2023

(54) APPARATUS AND METHOD FOR SECURING A FREE MEMORY BLOCK IN A MEMORY SYSTEM

(71) Applicant: SK hynix Inc., Gyeonggi-do (KR)

(72) Inventor: Dong Young Seo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/368,306

(22) Filed: Jul. 6, 2021

(65) Prior Publication Data

US 2022/0237115 A1    Jul. 28, 2022

(30) Foreign Application Priority Data

Jan. 27, 2021 (KR) .................... 10-2021-0011238

(51) Int. Cl.
  *G06F 12/02* (2006.01)
  *G06F 1/30* (2006.01)
  *G06F 12/0891* (2016.01)

(52) U.S. Cl.
  CPC ............ *G06F 12/0253* (2013.01); *G06F 1/30* (2013.01); *G06F 12/0246* (2013.01); *G06F 12/0292* (2013.01); *G06F 12/0891* (2013.01)

(58) Field of Classification Search
  None
  See application file for complete search history.

(56) References Cited

U.S. PATENT DOCUMENTS

| | | | |
|---|---|---|---|
| 11,543,998 B2* | 1/2023 | Park | G06F 3/061 |
| 2007/0174579 A1* | 7/2007 | Shin | G06F 12/0246 711/170 |
| 2008/0301393 A1* | 12/2008 | Kim | G06F 12/0246 711/170 |
| 2017/0109276 A1* | 4/2017 | Lee | G06F 12/0246 |
| 2017/0177469 A1* | 6/2017 | Hashimoto | G06F 12/0246 |
| 2017/0255405 A1* | 9/2017 | Zettsu | G06F 3/0679 |
| 2019/0310936 A1* | 10/2019 | Novogran | G06F 12/0868 |
| 2020/0192793 A1* | 6/2020 | Kim | G06F 3/0659 |
| 2021/0255941 A1* | 8/2021 | Hong | G06F 11/3089 |
| 2021/0326061 A1* | 10/2021 | Park | G06F 3/0659 |

FOREIGN PATENT DOCUMENTS

KR   10-2017-0035155   3/2017
KR   10-2019-0092054   8/2019

* cited by examiner

*Primary Examiner* — Charles Rones
*Assistant Examiner* — Ryan Dare
(74) *Attorney, Agent, or Firm* — IP & T GROUP LLP

(57) ABSTRACT

A memory system includes a memory device including plural memory blocks and a controller configured to perform garbage collection on a victim block among the plural memory blocks. The controller is further configured to stop the garbage collection in response to an interrupt and invalidate a valid data item, which is copied from the victim block to a target block during the garbage collection.

20 Claims, 9 Drawing Sheets

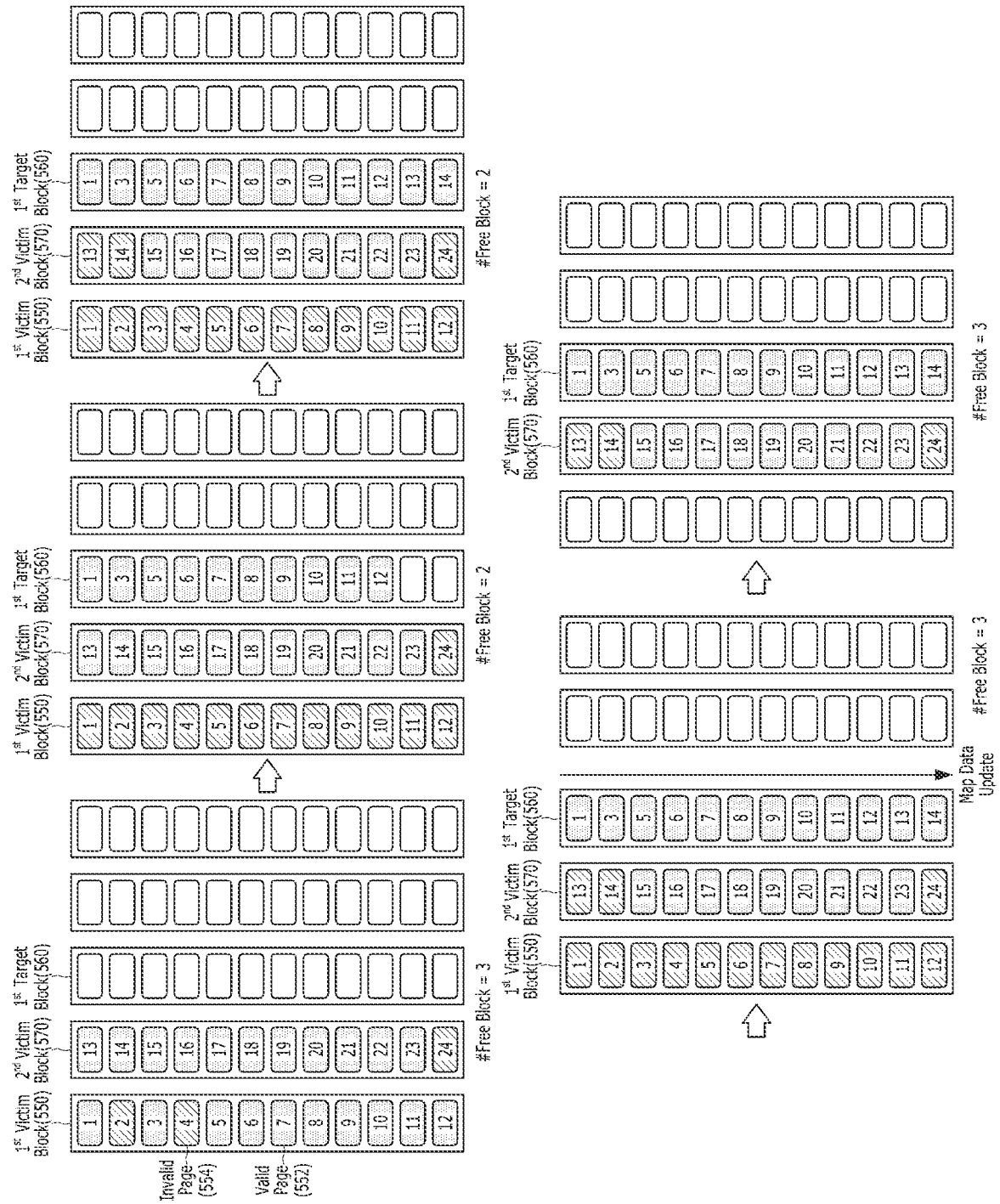

APPARATUS AND METHOD FOR SECURING A FREE MEMORY BLOCK IN A MEMORY SYSTEM

CROSS-REFERENCE TO RELATED APPLICATIONS

This patent application claims the benefit of Korean Patent Application No. 10-2021-0011238, filed on Jan. 27, 2021, the entire disclosure of which is incorporated herein by reference.

TECHNICAL FIELD

One or more embodiments of the present disclosure described herein relate to an apparatus and method for securing a free memory block in a non-volatile memory system.

BACKGROUND

Recently, a paradigm for a computing environment has shifted to ubiquitous computing, which enables computer systems to be accessed virtually anytime and anywhere. As a result, the use of portable electronic devices (e.g., mobile phones, digital cameras, notebook computers, or the like) are rapidly increasing. Such portable electronic devices each may use or include a memory system having at least one memory device. The memory system may be a data storage device. The data storage device can be used as a main storage device or an auxiliary storage device of a portable electronic device.

Unlike a hard disk, such a data storage device uses non-volatile semiconductor memories, exhibits improved stability and durability, has no mechanical driving parts (e.g., a mechanical arm), and thus provides high data access speeds and relatively low power consumption.

Examples of the data storage device having such advantages include, but are not limited to, Universal Serial Bus (USB) memory devices, memory cards having various interfaces, solid state drives (SSDs), and so on.

BRIEF DESCRIPTION OF THE DRAWINGS

The description herein makes reference to the accompanying drawings wherein like reference numerals refer to like parts throughout the figures.

FIG. 9 illustrates an example of garbage collection performed by a memory system according to an embodiment of the present disclosure.

DETAILED DESCRIPTION

Figure 1:
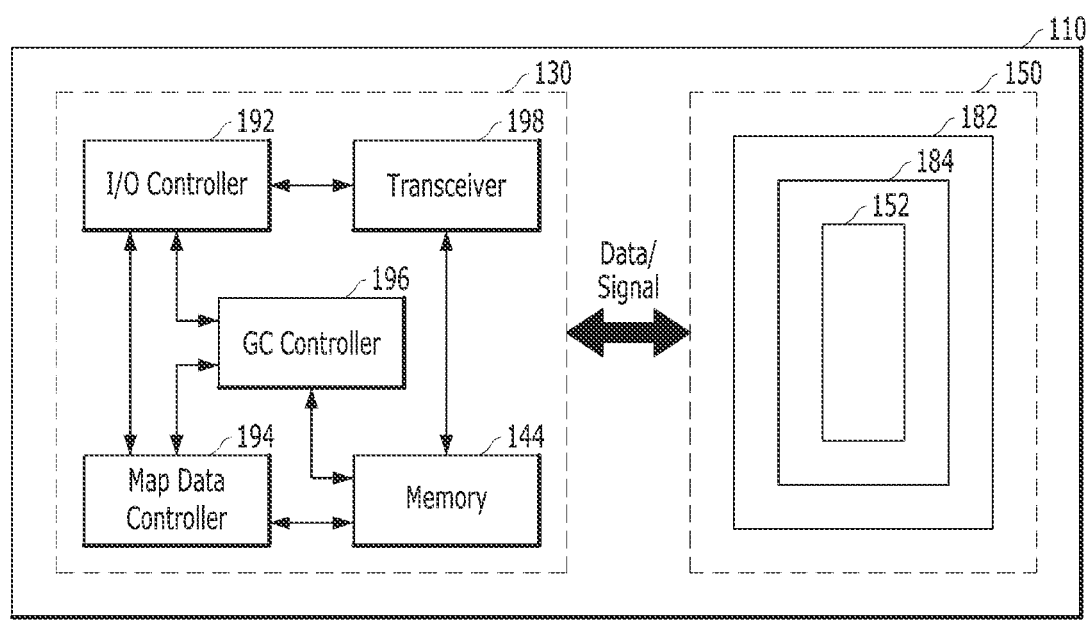
FIG. 1 illustrates a memory system according to an embodiment of the present disclosure.

Various embodiments of the present disclosure are described below with reference to the accompanying drawings. Elements and features of the disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim does not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry or logic) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language include hardware, for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in the disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or portion of a processor and its (or their) accompanying software and/or firmware. The term "circuitry" or "logic" also covers, for example, and if applicable to a particular claim element, an integrated circuit for a storage device.

As used herein, these terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

An embodiment of the present disclosure can provide a data processing system and a method for operating the data processing system. The data processing system includes components and resources such as a memory system and a host, and is capable of dynamically allocating plural data paths used for data communication between the components based on usages of the components and the resources.

When power supplied to a memory system is unstable or interrupts frequently occur, free blocks in the nonvolatile memory device can be quickly exhausted. Garbage collection to secure the free blocks is not sufficiently performed. In an embodiment of the present disclosure, a method and apparatus can be provided for avoiding that a memory system or a memory device becomes a stuck status because the memory system or the memory device might not secure a free memory block during garbage collection.

To this end, the memory system may not update a map data item if garbage collection is stopped without completion thereof due to an interrupt while the garbage collection is being performed. Also, while the garbage collection is performed, the memory system may not update a map data item while all valid data items included in a victim block are copied to a target block, but may update the map data item when the target block is filled with the copied data items.

According to an embodiment of the present disclosure, although a time spent on securing a free memory block through the garbage collection may be delayed, it is possible to avoid reduction of free memory blocks, which may be used, but not secured, due to an interruption during garbage collection. Although performance of garbage collection may be degraded, this scheme can be used in an operating condition or environment in which the number of free blocks in a non-volatile memory device in a memory system falls below a preset reference, in order to avoid exhaustion of free memory blocks and to secure a free memory block stably.

In an embodiment, a memory system can include a memory device including plural memory blocks; and a controller configured to perform garbage collection on a victim block among the plural memory blocks. The controller can be further configured to stop the garbage collection in response to an interrupt and invalidate a valid data item, which is copied from the victim block to a target block during the garbage collection.

The interrupt can be caused by a sudden power off (SPO).

The controller can be further configured to monitor a number of free blocks among the plural memory blocks in the memory device.

The controller can be configured to invalidate the valid data item copied during the garbage collection, when the number of free blocks among the plural memory block is less than a preset reference.

The controller can perform the garbage collection by: selecting the victim block among the plural memory blocks, selecting the target block among the plural memory blocks, and copying the valid data item included in the victim block to the target block. The controller is further configured to update a map data item associated with the valid data item when the target block is fully filled with data items.

The controller can be further configured to add a first map data item into a first map table after copying the valid data item to the target block. The controller can update the map data item associated with the valid data item by updating a second map table based on the first map table when the target block is fully filled with the data items. The first map item can associate a physical address with a logical address. The second map table can include a second map item in the second map table associating the logical address with the physical address.

The controller can be further configured to temporarily store the first map table in a volatile memory and store the second map table in the memory device. The controller can be configured to invalidate the valid data item by skipping the updating of the second map table based on the first map table when the garbage collection is stopped due to the interrupt before the target block is fully filled with data items.

The controller can be configured to check whether the target block is erased after selecting the target block and perform an erase operation on the target block based on a result of the checking.

The controller can be further configured to perform the garbage collection on the victim block again when the memory system becomes operable.

In another embodiment, a method for operating a memory system can include determining a victim block among plural memory blocks in a memory device; determining a target block among the plural memory blocks; copying a valid data item from the victim block to the target block; and stopping the copying and invalidating the valid data item copied to the target block, in response to an interrupt.

The interrupt can be caused by a sudden power off (SPO).

The method can further include monitoring a number of free blocks among the plural memory blocks in the memory device.

The valid data item copied from the victim block to the target block can be invalidated when the number of free blocks among the plural memory block is less than a preset reference.

The method can further include updating a map data item associated with the valid data item when the target block is fully filled with data items.

The method can further include adding a first map data item into a first map table after copying the valid data item to the target block. The updating the map data item associated with the valid data item can include updating a second map table based on the first map table when the target block is fully filled with the data items. The first map item can associate a physical address with a logical address. The second map table can include a second map item associating the logical address with the physical address.

The method can further include temporarily storing the first map table in a volatile memory, and storing the second map table in the memory device. The invalidating the valid data item includes skipping the updating of the second map table based on the first map table when the garbage collection is stopped due to the interrupt before the target block is fully filled with the data items.

The method can further include checking whether the target block is erased after selecting the target block; and performing an erase operation on the target block based on a result of the checking.

The method can further include performing the garbage collection on the victim block again when the memory system becomes operatable.

In another embodiment, a controller is coupled via at least one data path to a memory device including plural memory blocks. The controller can include at least one processor, at least one memory, and a logic, at least a portion of the logic comprised in hardware. The logic is configured to: determine a victim block and a target block among the plural memory blocks; copy a valid data item from the victim block to the target block; and stop the copying of the valid data item and invalidate the valid data item copied to the target block, in response to an interrupt.

The logic can be further configured to temporarily store a first map table in a volatile memory and store a second map table in the memory device. The logic can invalidate the valid data item by skipping an operation of updating the second map table based on the first map table when the copying is stopped due to the interrupt before the target block is fully filled with data items.

In another embodiment, an operating method of a controller can include controlling a storage device to sequentially copy valid page data from a sequence of one or more first blocks to a second block while temporarily storing, in an operational memory, physical-to-logical (P2L) map data representing a storage location change of the copied data due to the sequential copy; and invalidating the copied data within the first blocks and validating the copied data within the second block, when the second block becomes full of the copied data, by updating based on the P2L map data and logical-to-physical (L2P) map data stored in the storage device.

Embodiments of the present disclosure will now be described with reference to the accompanying drawings, wherein like numbers reference like elements.

FIG. 1 illustrates a memory system 110 according to an embodiment of the present disclosure.

Referring to FIG. 1, the memory system 110 may include a memory device 150 and a controller 130. The memory device 150 and the controller 130 may be physically separated from each other in the memory system 110. The memory device 150 and the controller 130 may be connected via at least one data path. For example, the data path may include a channel and/or a way. According to an embodiment, the memory device 150 and the controller 130 may be functionally divided. Further, according to an embodiment, the memory device 150 and the controller 130 may be implemented with a single chip or a plurality of chips.

The memory device 150 may include a plurality of memory blocks 152. The memory block 152 may be understood as a group of non-volatile memory cells in which data is erased together during a single erase operation. The memory block 152 may include a plurality of pages. According to an embodiment, each page may be understood as a group of non-volatile memory cells in which data is stored together during a single program operation or read out together during a single read operation.

The memory device 150 may include a plurality of memory planes 184 or a plurality of memory dies 182. According to an embodiment, a memory plane 184 may be considered a logical or a physical partition including at least one memory block 152, a driving circuit capable of controlling an array including a plurality of non-volatile memory cells, and a buffer that can temporarily store data to be input to the non-volatile memory cells or data output from non-volatile memory cells.

In addition, according to an embodiment, a memory die 182 may include at least one memory plane 184. The memory die 182 may be understood as a set of components implemented on a physically distinguishable substrate. Each memory die 182 may be connected to the controller 130 through a data path. Each memory die 182 may include an interface to exchange data and a signal with the controller 130.

According to an embodiment, the memory device 150 may include at least one memory block 152, at least one memory plane 184, or at least one memory die 182. The internal configuration of the memory device 150 shown in FIG. 1 may be changed according to performance of the memory system 110. Therefore, embodiments are not limited to the internal configuration shown in FIG. 1.

Figure 2:
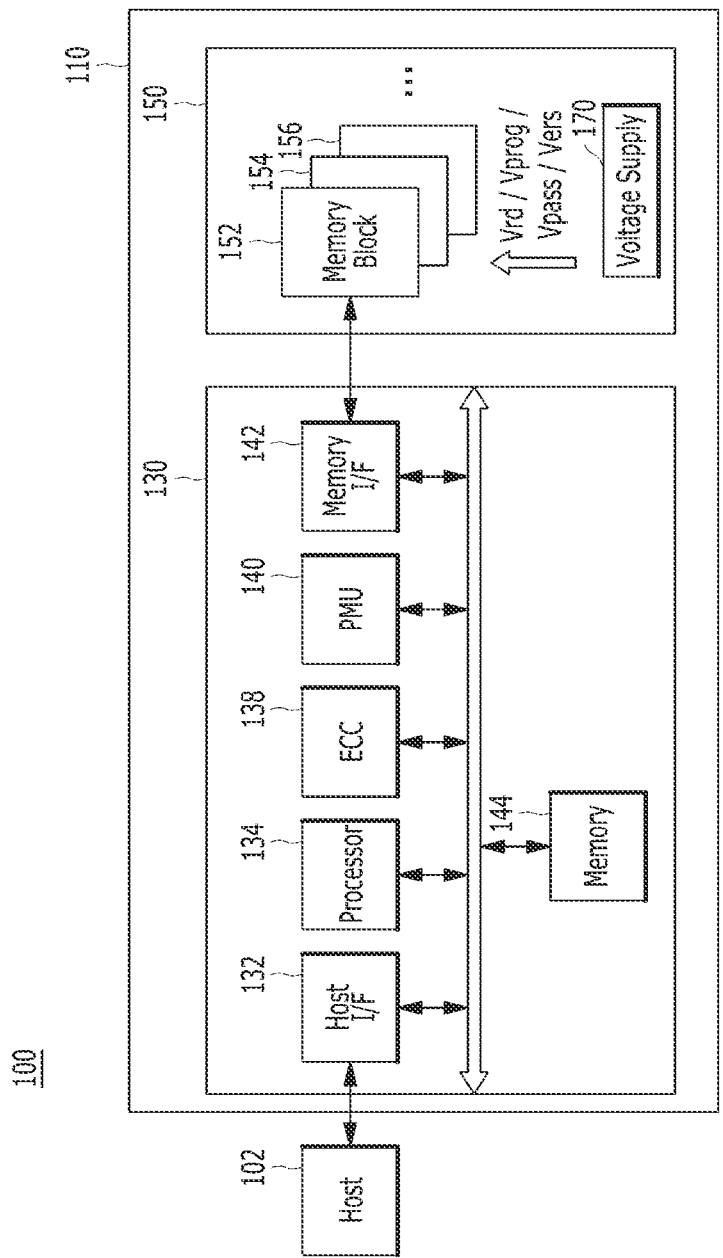
FIG. 2 illustrates a data processing system according to an embodiment of the present disclosure.
Figure 3:
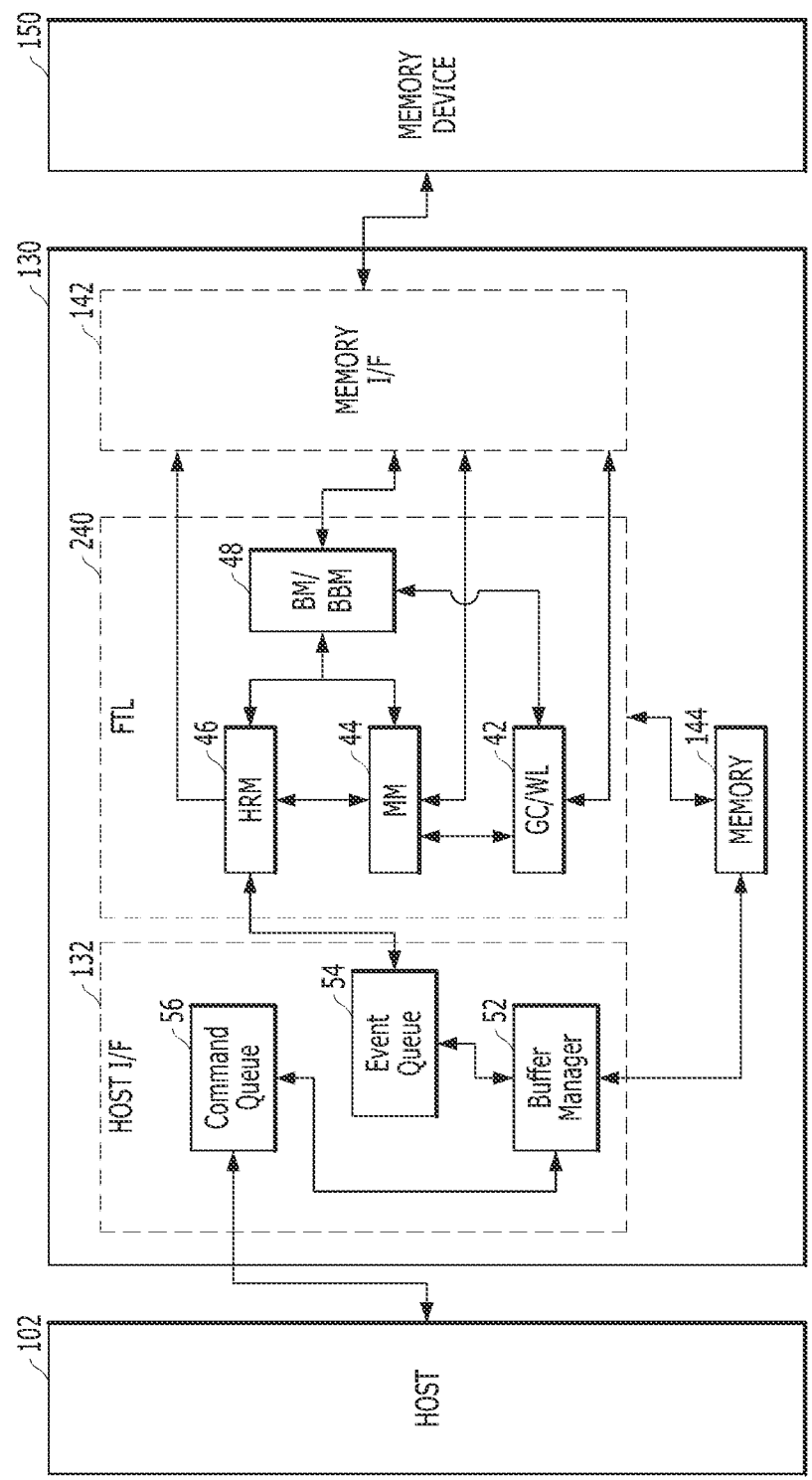
FIG. 3 illustrates a memory system according to another embodiment of the present disclosure.

In order to store data requested by an external device, e.g., a host 102 shown in FIGS. 2-3, in the memory device 150 (e.g., a storage space including non-volatile memory cells), the memory system 110 may perform address translation between a file system used by the host 102 and a physical location of the storage space including the non-volatile memory cells. For example, a data address determined according to the file system used by the host 102 may be called a logical address or a logical block address, while an address for the physical location at which data is to be stored in the storage space may be referred to as a physical address or a physical block address.

When the host 102 transfers a logical address to the memory system 110 together with a read request, the memory system 110 searches for a physical address associated with the logical address, reads data stored at a physical location recognized by the physical address, and outputs read data to the host 102. During this procedure, the address translation may be performed in the memory system 110 in order to search for the physical address associated with the logical address input from the host 102.

The controller 130 may perform a data input/output operation in response to a request input from the external device. For example, when the controller 130 performs a read operation in response to a read request input from the external device, data stored in a plurality of non-volatile memory cells included in the memory device 150 is transferred to the controller 130. In the read operation, an input/output (I/O) controller 192 may perform address translation between a logical address input from the external device and a physical address, and then transmit, to the memory device 150, the physical address and a read command corresponding to the read request through a transceiver 198. The transceiver 198 may transmit the physical address and the read command to the memory device 150 and receive data output from the memory device 150 corresponding to the physical address. The transceiver 198 may temporarily store the data transferred from the memory device 150 in a memory 144. The I/O controller 192 may output the data stored in the memory 144 to the external device in response to the read request.

In addition, the I/O controller 192 may transmit write data input along with a write request from the external device to the memory device 150 through the transceiver 198. After storing the write data in the memory device 150, the I/O controller 192 may transmit a response corresponding to the write request to the external device. The I/O controller 192 may generate or update map data that associates a physical address, which indicates a location where the write data is stored in the memory device 150, with a logical address input along with the write request.

When the I/O controller 192 performs the data input/output operation, a map data controller 194 controls or manages map data used by the controller 130. The map data may include plural map data items, each of which may associate a logical address with a physical address, or vice versa. The map data or the map data item can be used as operation information for the data input/output operation performed by the controller 130. For example, the I/O controller 192 may use the map data for address translation, and map data items may be updated or generated after write data corresponding to a write request is programmed in the memory device 150.

According to an embodiment, the map data may be classified into first map data (e.g., a Logical to Physical (L2P) table) for associating a logical address with a physical address and second map data (e.g., a Physical to Logical (P2L) table) for associating a physical address with a logical address. For example, the map data controller 194 may configure the first map data or the second map data that is loaded or stored in the memory 144 from the memory device 150.

Plural pieces of data may be stored in each of the plurality of memory blocks 152. Specifically, the plurality of memory blocks 152 can be classified into: a free block having no data items, an open block which is used for a program operation and includes at least one blank page, and a closed block of which all pages are programmed with data items. The closed block cannot be programmed with a new data item before an erase operation is performed on the closed block. As data input/output operations are performed, at least one data item in the closed block may become invalid.

When a piece of data is updated with a new piece of data or is no longer needed, the corresponding piece of data may become invalid. Even if some pieces of data stored in each of the plurality of memory block 152 are invalid, other pieces of data stored in each of the plurality of memory block 152 may still be valid. Because the erase operation is performed on a block-by-block basis as described above, it may be difficult to effectively use an area (i.e., some non-volatile memory cells in a memory block 152) in which invalid data remains to program other data until an erase operation is performed on the memory block 152. As plural data input/output operations are performed in the memory system 110, areas in which invalid data are stored in each of the plurality of memory blocks 152 in the memory device 150 may increase because invalid data may occur. If this situation is left unattended, the plurality of memory blocks 152 in the memory device 150 might not be effectively used. The controller 130 may check the state of the memory device 150 and perform garbage collection (GC) to improve performance of the memory system 110.

The garbage collection (GC) performed by the controller 130 may include a process for preparing a memory block to program new data by searching for an area, which is no longer usable or no longer needed among dynamically allocated memory areas, and erasing data left in the area. A time required to erase data in a specific area in the non-volatile memory device 150 may vary according to structures or characteristics of non-volatile memory cells in the memory device 150. Further, according to an embodiment, a time required to search for an area to be erased in the non-volatile memory device 150 may vary depending on a method and an apparatus for operating or controlling the non-volatile memory device 150. For example, the garbage collection (GC) may include a procedure for selecting a target memory block to be erased among the plurality of memory blocks 60 in the memory device 150, copying valid data in the selected memory block to another memory block, updating map information associated with copied data, and performing an erase operation on the selected memory block.

During the data input/output operation performed by the input/output controller 192 and the garbage collection (GC) performed by the garbage collection controller 196, when a data item is programmed in the memory device 150, a map data item associated with the data item should be generated, corrected, or updated. The map data controller 194 in the controller 130 may generate, control, manage, or update a map data item stored in the memory device 150. When the input/output controller 192 programs data in the memory device 150 and then generates a second map data item (e.g., P2L map data item), the map data controller 194 can collect a second map item (e.g., P2L map data item) generated by the input/output controller 192, update a first map data item (e.g., L2P map data item) based on the second map data item (e.g., P2L map data item) in response to a preset event, and store updated first map data items in the memory device 150. According to an embodiment, the second map data item (e.g., P2L map data item) may be stored temporarily in the memory 144, and the first map data item (e.g., L2P map data item) may be stored in the memory device 150.

During a data input/output operation performed by the input/output controller 192 and a garbage collection (GC) performed by a garbage collection controller 196, a data item may be programmed at a new location (e.g., a target block) in the memory device 150. If a second map data item (e.g., P2L map data item) corresponding to the new location is generated but the first map data item (e.g., L2P map data item) is not updated based on the generated second map data (e.g., P2L map data item), the controller 130 cannot find the data item stored at the new location after second map data item (e.g., P2L map data item) disappears. After programming data items at new locations during garbage collection, the map data controller 194 in the memory system 110 according to an embodiment of the disclosure collects generated second map data items (e.g., P2L map data items) indicating the new locations due to the garbage collection. When a valid data item in a victim block selected for garbage collection is copied to a target block and a second map data item (e.g., P2L map data item) associated with the copied valid data item is generated, the first map data item (e.g., L2P map data item) may not be updated based on the second map data item (e.g., P2L map data item) until the target block is fully filled with the copied data items.

In a conventional memory system, when at least some valid data items included in a victim block are copied to a target block, first map data items (e.g., L2P map data items) can be updated based on second map data items (e.g., P2L map data items). When no valid data items remain in the victim block, the controller 130 may regard the victim block as a free block. That is, the controller 130 may perform an erase operation on the corresponding memory block, in order to program other data items.

However, before copying all valid data items in the victim block to the target block, an interrupt may occur in the memory system 110. The garbage collection controller 196 can stop garbage collection in progress, in response to the interrupt. Examples of interrupts may include sudden power off (SPO). When the garbage collection controller 196 stops the garbage collection in response to an interrupt, the map data controller 194 can omit an operation for updating the first map data item (e.g., L2P map data item) based on the collected second map data item (e.g., P2L map data item). Instead of updating the first map data item (e.g., L2P map data item), the map data controller 194 may discard the collected second map data item (e.g., P2L map data item).

In a conventional memory system, after a sudden power off (SPO) occurs, a second map data item (P2L map data item) associated with a valid data item copied from the victim block to the target block is urgently stored in the memory device 150 as backup data in order to enhance or increase the performance of garbage collection. When power is supplied again later, a conventional memory system may perform an operation of updating a first map data item based on the backup data to restore the garbage collection performed before the sudden power off (SPO). The conventional memory system can continuously perform the garbage collection regarding valid data items that are still included in the victim block. In such a conventional memory system, it is possible to reduce a write amplification factor (WAF) due to the garbage collection. However, the target block cannot be fully filled with valid data items when sudden power off (SPO) frequently occurs. Because a free block can be used as the target block, the number of free blocks in the memory device 150 can be drastically reduced. This will be described later with reference to FIG. 5.

In an embodiment, the memory system 110 may differently adjust an update timing of map data based on the garbage collection in response to an operating condition or environment of the memory device 150. For example, when the number of free blocks in the memory device 150 is greater than a preset reference, the controller 130 performs the garbage collection and updates the map data to reduce the write amplification factor (WAF), avoid reduction of the lifespan of the memory device 150, and reduce overheads in the memory system 110. On the other hand, when the number of free blocks in the memory device 150 is less than the preset reference, the controller 130 may prioritize avoiding rapid consumption of free blocks and stably secure a free block to keep or increase the number of free blocks. After a second map data item (e.g., P2L map data item) associated with a valid data item copied to a new location (i.e., the target block) is generated while performing the garbage collection, the map data controller 194 in the controller 130 can collect the second map data item (e.g., P2L map data item) without update of the first map data item (e.g., L2P map data item) until the target block is fully filled with data items, and then update the first map data item (e.g., L2P map data item) based on the so-far-collected second map data item (e.g., P2L map data item) when the target block is fully filled with data items (e.g., the target block is closed). In addition, when the garbage collection is stopped in response to an interrupt before the target block is fully filled with the copied data items, the map data controller 194 can omit or skip an operation for updating the first map item (e.g., L2P map data item) based on the second map data item (e.g., P2L map data item). A method for updating a first map table (L2P table) including plural first map data items based on the garbage collection will be described later with reference to FIGS. 5 to 9.

Hereinafter, descriptions will be made focusing on operations or components that can be technically distinguished between the controller 130 and the memory device 150 described in FIG. 1 and FIGS. 2 to 4. Specifically, a flash translation layer (FTL) 240 in the controller 130 will be described in more detail with reference to FIGS. 3 to 4. According to an embodiment, roles and functions of the flash conversion layer (FTL) in the controller 130 may be varied.

FIGS. 2 and 3 illustrate some operations that may be performed by the memory system 110 according to one or more embodiments of the present disclosure.

Referring to FIG. 2, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

As shown in FIG. 1, the memory device 150 may include a plurality of memory blocks 152, 154, 156. The memory block 152, 154, 156 may be understood as a group of non-volatile memory cells in which data is removed together by a single erase operation. Although not illustrated, the memory block 152, 154, 156 may include a page which is a group of non-volatile memory cells that store data together during a single program operation or output data together during a single read operation. For example, one memory block may include a plurality of pages.

For example, the memory device 150 may include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells.

In addition, according to an embodiment, the memory die may include at least one memory plane. The memory die may be understood as a set of components implemented on a physically distinguishable substrate. Each memory die may be connected to the controller 130 through a data path. Each memory die may include an interface to exchange an item of data and a signal with the controller 130.

According to an embodiment, the memory device 150 may include at least one memory block 152, 154, 156, at least one memory plane, or at least one memory die. The internal configuration of the memory device 150 shown in FIG. 1 may be different according to performance of the memory system 110. An embodiment of the present disclosure is not limited to the internal configuration shown in FIG. 2.

Referring to FIG. 2, the memory device 150 may include a voltage supply circuit capable of supplying at least some voltage into the memory block 152, 154, 156. The voltage supply circuit may supply a read voltage Vrd, a program voltage Vprog, a pass voltage Vpass, or an erase voltage Vers into a non-volatile memory cell included in the memory block. For example, during a read operation for reading data stored in the non-volatile memory cell included in the memory block 152, 154, 156, the voltage supply circuit may supply the read voltage Vrd into a selected non-volatile memory cell. During the program operation for storing data in the non-volatile memory cell included in the memory block 152, 154, 156, the voltage supply circuit may supply the program voltage Vprog into a selected non-volatile memory cell. Also, during a read operation or a program operation performed on the selected nonvolatile memory cell, the voltage supply circuit may supply a pass voltage Vpass into a non-selected nonvolatile memory cell. During the erasing operation for erasing data stored in the non-volatile memory cell included in the memory block 152, 154, 156, the voltage supply circuit may supply the erase voltage Vers into the memory block.

The memory device 150 may store information regarding various voltages which are supplied to the memory block 152, 154, 156 based on which operation is performed. For example, when a non-volatile memory cell in the memory block 152, 154, 156 can store multi-bit data, plural levels of the read voltage Vrd for recognizing or reading the multi-bit data item may be required. The memory device 150 may include a table including information corresponding to plural levels of the read voltage Vrd, corresponding to the multi-bit data item. For example, the table can include bias values stored in a register, each bias value corresponding to a specific level of the read voltage Vrd. The number of bias values for the read voltage Vrd that is used for a read operation may be limited to a preset range. Also, the bias values can be quantized.

The host 102 may include a portable electronic device (e.g., a mobile phone, an MP3 player, a laptop computer, etc.) or a non-portable electronic device (e.g., a desktop computer, a game player, a television, a projector, etc.).

The host 102 may also include at least one operating system (OS), which can control functions and operations performed in the host 102. The OS can provide interoperability between the host 102 engaged operatively with the memory system 110 and a user who intends to store data in the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or a user environment. As compared with the personal operating system, the enterprise operating systems can be specialized for securing and supporting high performance computing.

The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to the plurality of commands within the memory system 110.

A controller 130 in the memory system 110 may control a memory device 150 in response to a request or a command input from the host 102. For example, the controller 130 may perform a read operation to provide data read from the memory device 150 to the host 102 and may perform a write operation (or a program operation) to store data input from the host 102 in the memory device 150. In order to perform data input/output (I/O) operations, the controller 130 may control and manage internal operations of reading data, programming data, erasing data, or the like.

According to an embodiment, the controller 130 may include a host interface 132, a processor 134, error correction circuitry (ECC) 138, a power management unit (PMU) 140, a memory interface 142, and a memory 144. Components included in the controller 130 as illustrated in FIG. 2 may vary according to structures, functions, operation performance, or the like, regarding the memory system 110.

For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components may be added to or omitted from the controller 130 according to implementation of the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 included in the controller 130 may receive signals, commands (or requests), and/or data input from the host 102. For example, the host 102 and the memory system 110 may use a predetermined protocol to transmit and receive data therebetween. Examples of protocols or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), and the like. According to an embodiment, the host interface 132 is a type of layer for exchanging data with the host 102 and is implemented with, or driven by, firmware called a host interface layer (HIL).

The Integrated Drive Electronics (IDE) or Advanced Technology Attachment (ATA) may be used as one of the interfaces for transmitting and receiving data and, for example, may use a cable including 40 wires connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a type of serial data communication interface that is compatible with various ATA standards of parallel data communication interfaces which are used by Integrated Drive Electronics (IDE) devices. The 40 wires in the IDE interface can be reduced to six wires in the SATA interface. For example, 40 parallel signals for the IDE can be converted into 6 serial signals for the SATA interface. The SATA interface has been widely used because of its faster data transmission and reception rate and its less resource consumption in the host 102 used for the data transmission and reception. The SATA interface may connect up to 30 external devices to a single transceiver included in the host 102. In addition, the SATA interface can support hot plugging that allows an external device to be attached to or detached from the host 102, even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely attached to or detached from the host 102 like an external hard disk.

Small Computer System Interface (SCSI) is a type of serial data communication interface used for connecting a computer or a server with other peripheral devices. The SCSI can provide a high transmission speed, as compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI can support connections of 15 other devices to a single transceiver included in host 102.

Serial Attached SCSI (SAS) can be understood as a serial data communication version of the SCSI. In the SAS, the host 102 and a plurality of peripheral devices are connected in series, and data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., x1, x4, x8, or x16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe can support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of data read from the memory device 150, and may include an error correction code (ECC) encoder and an ECC decoder. The ECC encoder may perform error correction encoding of data to be programmed in the memory device 150 to generate encoded data into which a parity bit is added, and store the encoded data in memory device 150. The ECC decoder can detect and correct error bits contained in the data read from the memory device 150 when the controller 130 reads the data stored in the memory device 150. For example, after performing error correction decoding on the data read from the memory device 150, the error correction circuitry 138 determines whether the error correction decoding has succeeded or not, and outputs an instruction signal (e.g., a correction success signal or a correction fail signal), based on a result of the error correction decoding. The error correction circuitry 138 may use a parity bit, which has been generated during the ECC encoding process for the data stored in the memory device 150, in order to correct the error bits of the read data. When the number of the error bits is greater than or equal to the number of correctable error bits, the error correction circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above described codes.

For example, the ECC decoder may perform hard decision decoding or soft decision decoding on data transmitted from the memory device 150. The hard decision decoding can be understood as one of two methods broadly classified for error correction. The hard decision decoding may include an operation of correcting an error bit by reading digital data of '0' or '1' from a non-volatile memory cell in the memory device 150. Because the hard decision decoding handles a binary logic signal, the circuit/algorithm design or configuration may be simpler and a processing speed may be faster than the soft decision decoding.

The soft decision decoding may quantize a threshold voltage of a non-volatile memory cell in the memory device 150 by two or more quantized values (e.g., multiple bit data, approximate values, an analog value, and the like) in order to correct an error bit based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

According to an embodiment, the ECC decoder may use low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like the hard decision decoding, and iteratively repeats it through a message exchange in order to improve reliability of the values. Then, the values are finally determined as data of 1 or 0. For example, a decoding algorithm using LDPC codes can be understood as probabilistic decoding. The hard decision decoding in which a value output from a non-volatile memory cell is coded as 0 or 1. Compared to the hard decision decoding, the soft decision decoding can determine the value stored in the non-volatile memory cell based on the stochastic information. Regarding bit-flipping (which may be considered an error that can occur in the memory device 150), the soft decision decoding may provide improved probability of correcting the error and recovering data, as well as providing reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) for the soft decision decoding. The LDPC-CCs may have a scheme using a linear time encoding and a pipeline decoding based on a variable block length and a shift register.

According to an embodiment, the ECC decoder may use, for example, a Log Likelihood Ratio Turbo Code (LLR-TC) for the soft decision decoding. A Log Likelihood Ratio (LLR) may be calculated as a non-linear function for a distance between a sampled value and an ideal value. In addition, a Turbo Code (TC) may include a simple code (for example, a Hamming code) in two or three dimensions and repeat decoding in a row direction and a column direction to improve reliability of values.

The power management unit (PMU) 140 may control electrical power provided to the controller 130. The PMU 140 may monitor the electrical power supplied to the memory system 110 (e.g., a voltage supplied to the controller 130) and provide the electrical power to components included in the controller 130. The PMU 140 may not only detect power-on or power-off, but also generate a trigger signal to enable the memory system 110 to back up a current state urgently when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory.

For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data of operations performed in the memory system 110 and the controller 130. For example, the memory 144 may temporarily store read data output from the memory device 150 in response to a read request from the host 102 before the read data is output to the host 102. In addition, the controller 130 may temporarily store write data input from the host 102 in the memory 144 before programming the write data in the memory device 150. When the controller 130 controls operations, such as a data read operation, a data write or program operation, a data erase operation, etc., of the memory device 150, data transmitted between the controller 130 and the memory device 150 of the memory system 110 may be temporarily stored in the memory 144.

In addition to the read data or write data, the memory 144 may store information (e.g., map data, read requests, program requests, etc.) used for inputting or outputting data between the host 102 and the memory device 150. According to an embodiment, the memory 144 may include one or more of a command queue, a program memory, a data memory, a write buffer/cache, a read buffer/cache, a data buffer/cache, a map buffer/cache, and so on. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150 in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL will be described in detail, referring to FIGS. 3 and 4. According to an embodiment, the processor 134 may be implemented with a microprocessor, a central processing unit (CPU), or the like.

According to an embodiment, the memory system 110 may be implemented with at least one multi-core processor. The multi-core processor is a type of circuit or chip in which two or more cores, which are considered distinct processing regions, are integrated. For example, when a plurality of cores in the multi-core processor drive or execute a plurality of flash translation layers (FTLs) independently, a data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may perform an operation independent from a command or a request input from the host 102. In one case, an operation performed by the controller 130 in response to the request or the command input from the host 102 may be considered a foreground operation, while an operation performed by the controller 130 independently from the request or the command input from the host 102 may be considered a background operation. The controller 130 can perform foreground or background operations for reading, writing, or erasing data in the memory device 150. In addition, a parameter set operation corresponding to a set parameter command or a set feature command as a set command transmitted from the host 102 may be considered a foreground operation. Further, as a background operation that is performed without a command transmitted from the host 102, the controller 130 can perform garbage collection (GC), wear leveling (WL), bad block management for identifying and processing bad blocks, or the like.

According an embodiment, substantially similar operations may be performed as both the foreground operation and the background operation. For example, when the memory system 110 performs garbage collection in response to a request or a command input from the host 102 (e.g., Manual GC), the garbage collection can be considered a foreground operation. When the memory system 110 performs garbage collection independently of the host 102 (e.g., Auto GC), the garbage collection can be considered a background operation.

When the memory device 150 includes a plurality of dies (or a plurality of chips) each including a plurality of non-volatile memory cells, the controller 130 may perform a parallel processing regarding plural requests or commands input from the host 102 in order to improve performance of the memory system 110. For example, the transmitted requests or commands may be divided into plural groups including at least some of a plurality of planes, a plurality of dies, or a plurality of chips included in the memory device 150, and the plural groups of requests or commands are processed individually or in parallel in each plane, each die or each chip.

The memory interface 142 in the controller 130 may be connected to the plurality of dies or chips in the memory device 150 through at least one channel and at least one way. When the controller 130 distributes and stores data in the plurality of dies through each channel or each way in response to requests or commands associated with a plurality of pages including non-volatile memory cells, a plurality of operations corresponding to the requests or the commands can be performed simultaneously or in parallel in the plurality of dies or planes. Such a processing method or scheme can be considered as an interleaving method. Because a data input/output speed of the memory system 110 increases by operating with the interleaving method, data I/O performance of the memory system 110 can be improved.

By way of example but not limitation, the controller 130 can recognize statuses of a plurality of channels (or ways) associated with the plurality of dies included in the memory device 150. The controller 130 may determine a status of each channel or each way as one of a busy status, a ready status, an active status, an idle status, a normal status, and an abnormal status. The determination of which channel or way an instruction (and/or a data) is delivered through by the controller can be associated with a physical block address. The controller 130 may refer to descriptors delivered from the memory device 150. The descriptors may include a block or page of parameters describing something about the memory device 150. The descriptors can have a predetermined format or structure. For instance, the descriptors may include device descriptors, configuration descriptors, unit descriptors, and the like. The controller 130 may refer to, or use, the descriptors to determine which channel(s) or way(s) is used to exchange an instruction or data.

Referring to FIG. 2, the memory device 150 in the memory system 110 may include a plurality of memory blocks 152, 154, 156. Each of the plurality of memory blocks 152, 154, 156 includes a plurality of non-volatile memory cells. According to an embodiment, the memory block 152, 154, 156 can be a group of non-volatile memory cells erased together. The memory block 152, 154, 156 may include a plurality of pages which is a group of non-volatile memory cells read or programmed together.

In one embodiment, each memory block 152, 154, or 156 may have a three-dimensional stack structure for a high integration. Further, the memory device 150 may include a plurality of dies, each die including a plurality of planes, each plane including the plurality of memory blocks 152, 154, 156. A configuration of the memory device 150 may be changed depending on performance of the memory system 110.

FIG. 2 illustrates the memory device 150 that includes the plurality of memory blocks 152, 154, and 156 according to an embodiment of the present disclosure. The plurality of memory blocks 152, 154, and 156 may be any of single-level cell (SLC) memory blocks, multi-level cell (MLC) memory blocks, or the like, according to the number of bits that can be stored in one memory cell. An SLC memory block includes a plurality of pages implemented by memory cells, each memory cell storing one bit of data. An SLC memory block may have higher data I/O operation performance and higher durability than the MLC memory block. The MLC memory block includes a plurality of pages implemented by memory cells, each memory cell storing multi-bit data (e.g., two or more bits of data). The MLC memory block may have larger storage capacity for the same space compared to the SLC memory block. The MLC memory block can be highly integrated in a view of storage capacity.

In an embodiment, the memory device 150 may be implemented with MLC memory blocks such as a double level cell (DLC) memory block, a triple-level cell (TLC) memory block, a quadruple-level cell (QLC) memory block, and a combination thereof. The DLC memory block may include a plurality of pages implemented by memory cells, each memory cell capable of storing 2-bit data. The TLC memory block can include a plurality of pages implemented by memory cells, each memory cell capable of storing 3-bit data. The QLC memory block can include a plurality of pages implemented by memory cells, each memory cell capable of storing 4-bit data. In another embodiment, the memory device 150 can be implemented with a block including a plurality of pages implemented by memory cells, each memory cell capable of storing five or more bits of data.

According to an embodiment, the controller 130 may use an MLC memory block included in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. For example, the controller 130 may perform a data input/output operation with a higher speed when the MLC memory block is used as the SLC memory block. Thus, the controller 130 may use the MLC memory block as a SLC buffer to temporarily store data because the buffer may require a high data input/output speed for improving performance of the memory system 110.

Further, according to an embodiment, the controller 130 can program data in an MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing multi-bit data. For a MLC overwrite operation, the controller 130 may store the number of program times as separate operation information when 1-bit data is programmed in an MLC. According to an embodiment, an operation for uniformly levelling threshold voltages of the MLCs may be carried out before another 1-bit data is programmed in the same MLCs, each having stored another-bit data.

In an embodiment, the memory device 150 is embodied as a non-volatile memory such as a flash memory, for example, as a NAND flash memory, a NOR flash memory, or the like. In another embodiment, the memory device 150 may be implemented by at least one of a phase change random access memory (PCRAM), a ferroelectrics random access memory (FRAM), a transfer torque random access memory (STT-RAM), and a spin transfer torque magnetic random access memory (STT-MRAM), or the like.

Referring to FIG. 3, the controller 130 in a memory system operates along with the host 102 and the memory device 150. As illustrated, the controller 130 includes the host interface 132, a flash translation layer (FTL) 240, the memory interface 142, and the memory 144 previously identified with reference to FIG. 2.

According to an embodiment, the error correction circuitry 138 illustrated in FIG. 2 may be included in the flash translation layer (FTL) 240. In another embodiment, the error correction circuitry 138 may be implemented as a separate module, a circuit, firmware, or the like, which is included in or associated with the controller 130.

The host interface 132 may handle commands, data, and the like transmitted from the host 102. By way of example but not limitation, the host interface 132 may include a command queue 56, a buffer manager 52, and an event queue 54. The command queue 56 may sequentially store the commands, the data, and the like received from the host 102, and output them to the buffer manager 52, for example, in an order in which they are stored in the command queue 56. The buffer manager 52 may classify, manage, or adjust the commands, the data, and the like received from the command queue 56. The event queue 54 may sequentially transmit events for processing the commands, the data, and the like received from the buffer manager 52.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or a commands for reading data, i.e., a read command, and a command for programming/writing data, i.e., a write command, may be alternately transmitted to the memory system 110. The host interface 132 may sequentially store commands, data, and the like, which are transmitted from the host 102, in the command queue 56. Thereafter, the host interface 132 may estimate or predict what type of internal operations the controller 130 will perform according to the characteristics of the commands, the data, and the like, which have been transmitted from the host 102. The host interface 132 may determine a processing order and a priority of commands, data and the like based on their characteristics.

According to the characteristics of the commands, the data, and the like transmitted from the host 102, the buffer manager 52 in the host interface 132 is configured to determine whether the buffer manager 52 should store the commands, the data, and the like in the memory 144, or whether the buffer manager 52 should deliver the commands, the data, and the like to the flash translation layer (FTL) 240. The event queue 54 receives events, transmitted from the buffer manager 52, which are to be internally executed and processed by the memory system 110 or the controller 130 in response to the commands, the data, and the like, and delivers the events to the flash translation layer (FTL) 240 in the order of the events inputted to the event queue 54.

In accordance with an embodiment, the flash translation layer (FTL) 240 illustrated in FIG. 3 may implement a multi-thread scheme to perform data input/output (I/O) operations. A multi-thread FTL may be implemented through a multi-core processor using multi-thread included in the controller 130.

In accordance with an embodiment, the flash translation layer (FTL) 240 may include a host request manager (HRM) 46, a map manager (MM) 44, a state manager 42, and a block manager 48. The host request manager (HRM) 46 may manage the events transmitted from the event queue 54. The map manager (MM) 44 may handle or control map data. The state manager 42 may perform garbage collection (GC) or wear leveling (WL). The block manager 48 may execute commands or instructions onto a block in the memory device 150.

By way of example but not limitation, the host request manager (HRM) 46 may use the map manager (MM) 44 and the block manager 48 to handle or process requests according to read and program commands and events which are delivered from the host interface 132. The host request manager (HRM) 46 may send an inquiry request to the map manager (MM) 44 to determine a physical address corresponding to a logical address which is entered with the events. The host request manager (HRM) 46 may send a read request with the physical address to the memory interface 142 to process the read request, i.e., handle the events. In one embodiment, the host request manager (HRM) 46 may send a program request (or a write request) to the block manager 48 to program data to a specific empty page storing no data in the memory device 150, and then may transmit a map update request corresponding to the program request to the map manager (MM) 44 in order to update an item relevant to the programmed data in information of mapping the logical and physical addresses to each other.

The block manager 48 may convert a program request delivered from the host request manager (HRM) 46, the map manager (MM) 44, and/or the state manager 42 into a flash program request used for the memory device 150, in order to manage flash blocks in the memory device 150. In order to maximize or enhance program or write performance of the memory system 110, the block manager 48 may collect program requests and send flash program requests for multiple-plane and one-shot program operations to the memory interface 142. In an embodiment, the block manager 48 sends several flash program requests to the memory interface 142 to enhance or maximize parallel processing of a multi-channel and multi-directional flash controller.

In one embodiment, the block manager 48 may manage blocks in the memory device 150 according to the number of valid pages, select and erase blocks having no valid pages when a free block is needed, and select a block including the least number of valid pages when it is determined that garbage collection is to be performed. The state manager 42 may perform garbage collection to move valid data stored in the selected block to an empty block and erase data stored in the selected block so that the memory device 150 may have enough free blocks (i.e., empty blocks with no data). When the block manager 48 provides information regarding a block to be erased to the state manager 42, the state manager 42 may check all flash pages of the block to be erased to determine whether each page of the block is valid.

For example, to determine validity of each page, the state manager 42 may identify a logical address recorded in an out-of-band (00B) area of each page. To determine whether each page is valid, the state manager 42 may compare a physical address of the page with a physical address mapped to a logical address obtained from an inquiry request. The state manager 42 sends a program request to the block manager 48 for each valid page. A map table may be updated by the map manager 44 when a program operation is complete.

The map manager 44 may manage map data, e.g., a logical-physical map table. The map manager 44 may process various requests, for example, queries, updates, and the like, which are generated by the host request manager (HRM) 46 or the state manager 42. The map manager 44 may store the entire map table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant map table stored in the memory device 150. When the number of dirty cache blocks in the map manager 44 exceeds a certain threshold value, a program request may be sent to the block manager 48, so that a clean cache block is made and a dirty map table may be stored in the memory device 150.

When garbage collection is performed, the state manager 42 copies valid page(s) into a free block, and the host request manager (HRM) 46 may program the latest version of the data for the same logical address of the page and currently issue an update request. When the state manager 42 requests the map update in a state in which the copying of the valid page(s) is not completed normally, the map manager 44 might not perform the map table update. This is because the map request is issued with old physical information when the state manger 42 requests a map update and a valid page copy is completed later. The map manager 44 may perform a map update operation to ensure accuracy when, or only if, the latest map table still points to the old physical address.

Figure 4:
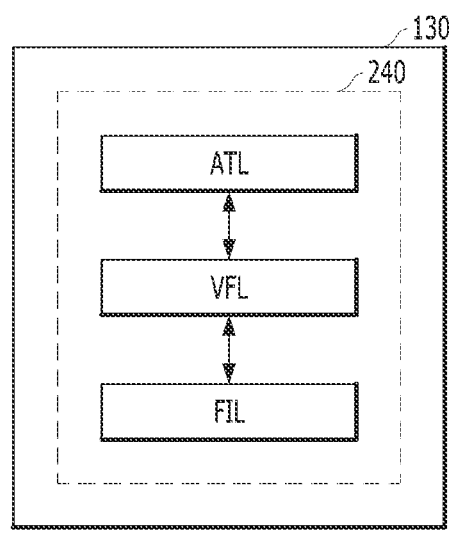
FIG. 4 illustrates internal configuration included in a controller shown in FIGS. 1 to 3 according to an embodiment of the present disclosure.

FIG. 4 illustrates internal configuration of the controller shown in FIG. 1 to 3 according to an embodiment of the present disclosure.

Referring to FIG. 4, the flash translation layer (FTL) 240 in the controller 130 can be divided into three layers: an address translation layer ATL; a virtual flash layer VFL; and a flash Interface Layer FIL.

For example, the address translation layer ATL may convert a logical address LA transmitted from a file system into a logical page address. The address translation layer ATL can perform an address translation process regarding a logical address space. That is, the address translation layer ATL can perform an address translation process based on mapping information to which the logical page address LPA of the flash memory 140 is mapped to the logical address LA transmitted from the host. Such logical-to-logical address mapping information (hereinafter referred to as L2L mapping) may be stored in an area in which metadata is stored in the memory device 150.

The virtual flash layer VFL may convert the logical page address LPA, which is mapped by the address translation layer ATL, into a virtual page address VPA. Here, the virtual page address VPA may correspond to a physical address of a virtual memory device. That is, the virtual page address VPA may correspond to the memory block 60 in the memory device 150. If there is a bad block among the memory blocks 60 in the memory device 150, the bad block may be excluded by the virtual flash layer VFL. In addition, the virtual flash layer VFL can include a recovery algorithm for scanning a scan area to restore the logical-to-virtual address mapping information (L2V mapping) stored in the memory device 150 and mapping information in the data region for storing user data. The recovery algorithm can be capable of recovering the logical-to-virtual address mapping information (L2V mapping). The virtual flash layer VFL may perform an address conversion process regarding the virtual address space, based on the logical-to-virtual address mapping information (L2V mapping) restored through such recovery algorithm.

The flash interface layer FIL can convert a virtual page address of the virtual flash layer VFL into a physical page address of the memory device 150. The flash interface layer FIL performs a low-level operation for interfacing with the memory device 150. For example, the flash interface layer FIL can include a low-level driver for controlling hardware of the memory device 150, an error correction code (ECC) for checking and correcting an error in data transmitted from the memory device 150, and a module for performing operations such as Bad Block Management (BBM).

Figure 5:
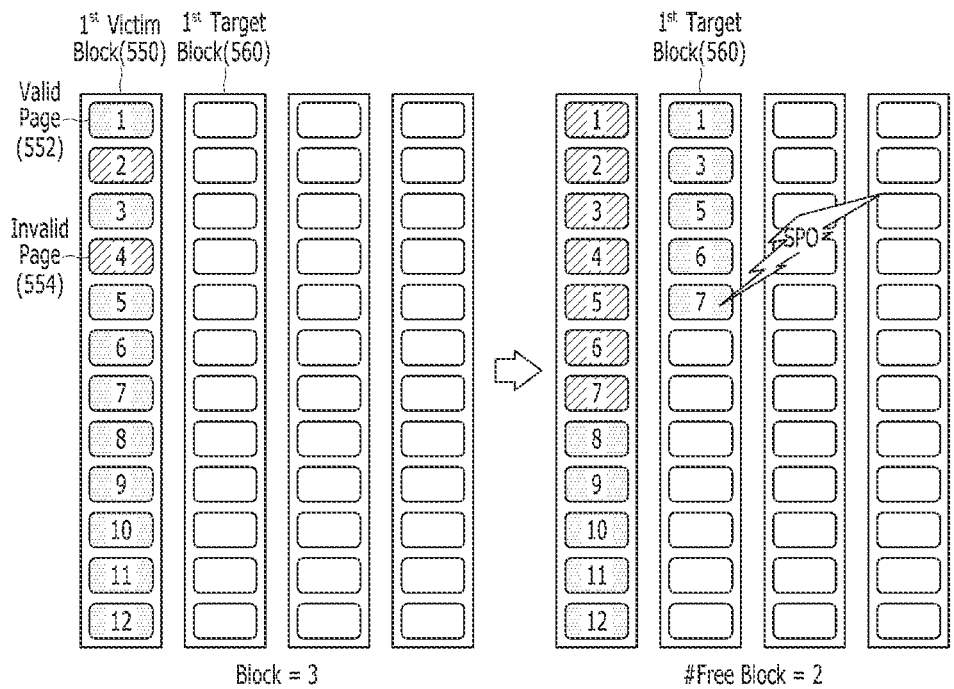
FIG. 5 illustrates a number of free memory blocks declining due to sudden power off (SPO) even while garbage collection is performed according to an embodiment of the present disclosure.
Figure 5:
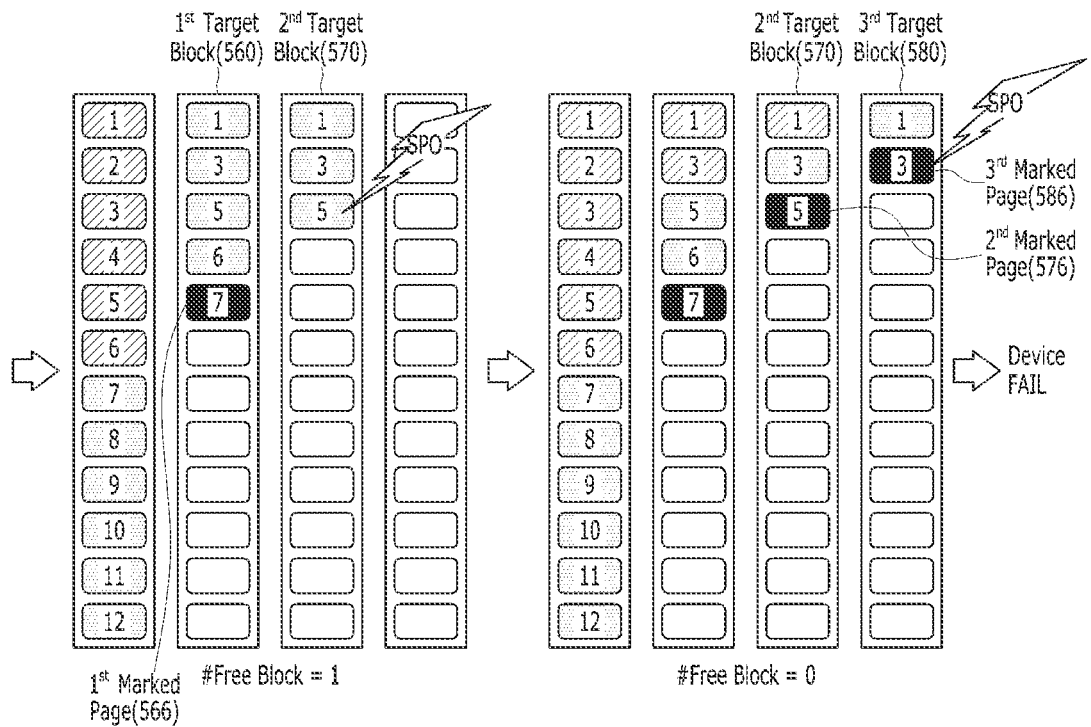

FIG. 5 illustrates a number of free memory blocks declining due to sudden power off (SPO) even while garbage collection is performed. In FIG. 5, there are four memory blocks in a memory device of a conventional memory system, and 12 pages are included in each memory block. In addition, three of the four memory blocks are free blocks, and at least one valid data item and at least one invalid data item are included in one memory block.

Referring to FIG. 5, the memory system can perform garbage collection on a first victim block 550 including at least one valid page 552 in which a valid data item is stored and at least one invalid page 554 in which an invalid data item is stored. The memory system may determine one of the three free blocks as a first target block 560.

Because invalid data items remain in second and fourth pages 554 in the first victim block 550, the garbage collection is performed so that valid data items stored in the other 10 pages can be copied in the first target block 560. When a valid data item in the first victim block 550 is copied to the first target block 560, the number of free blocks in the memory device 150 can be reduced from three to two. Valid data items in the first victim block 550 may be sequentially copied to the first target block 560. Sudden power off (SPO) can occur when a valid data item stored in the seventh page is copied to the first target block 560, except for the second and fourth pages 554 in the first victim block 550.

Due to sudden power off (SPO), the garbage collection can be stopped. In a conventional memory system, map data items associated with valid data items copied to the first target block 560 may be updated after power is supplied even if the garbage collection is stopped. Data items copied to the first target block 560 become valid but data items remaining in the first victim block 550 are no longer valid. In relation to the valid data item stored in the seventh page in the first victim block 550, a safety of the data item copied to the first target block 560 might not be guaranteed due to the sudden power off (SPO), so that the last copied page of the first target block 560 may be set as a first marked page 566. The copied data item stored in the first marked page 566 might not be recognized as a valid data item.

After power is supplied, the memory system can perform garbage collection again. The memory system can compare the numbers of valid data items (e.g., the numbers of valid pages), stored in the first target block 560 and the first victim block 560 individually, and select a victim block for the garbage collection based on a comparison result. Because the number of valid pages of the first target block 560 is less than the number of valid pages of the first victim block 550, valid data items in the first target block 560 can be copied to a second target block 570 which is selected from free blocks. As a data item is programmed into the second target block 570, the number of free blocks in the memory device may be reduced from two to one.

For example, sudden power off (SPO) may occur while valid data items in the first target block 560 are copied to the second target block 570 for the garbage collection performed again. Referring to FIG. 5, the sudden power-off (SPO) may occur when a data item stored in a third page of the first target block 560 is copied to the second target block 570. Because safety of a data item stored at a third page of the second target block 570 cannot be guaranteed, the third page of the second target block 570 may be set as a second marked page 576.

In a conventional memory system, when power is resumed after the garbage collection is stopped, a map data item may be updated. Copied data items at the first and second pages of the second target block 570 become a valid data item, and data items stored in the first and second pages of the first target block 560 become no longer valid.

The memory system can perform garbage collection again when power is resumed. During the garbage collection performed again, the memory system may copy valid data items in the second target block 570 to a third target block 580 which is a free block. As a valid data item is copied to the third target block 580, no more free blocks may remain in the memory device. Moreover, in a process of copying a valid data item stored at a second page in the second target block 570 to the third target block 580, sudden power-off (SPO) may occur.

After power is supplied, the memory system can recognize that a valid data item is stored at a first page of the third target block 580. Because the sudden power-off (SPO) occurs in the process of copying a data item to the second page of the third target block 580, safety of the data item copied at the second page could not be guaranteed. The second page of the third target block 580 may be set as a third marked page 586.

When power is supplied again, the memory system needs to perform garbage collection. In order for the memory system to perform garbage collection, a target block to which a valid data item is to be copied is required, but all free blocks in the memory device are exhausted. Accordingly, the memory system cannot perform garbage collection because there are no usable free blocks, so the memory system may become a stuck status. In this case, the memory device may not perform an additional operation anymore and may lead to a device failure.

Referring to FIG. 5, in an operating environment in which power is unstable or sudden power-off (SPO) frequently occurs, a memory system may not be able to completely perform garbage collection for securing a free block and repeatedly perform incomplete garbage collection. As garbage collection is repeatedly performed, free blocks are exhausted, but a new free block cannot be secured because the garbage collection cannot be successfully completed. Because such a situation may lead to device failure, an apparatus and an operating method capable of suppressing exhaustion of free blocks may be adopted in a memory system.

Figure 6:
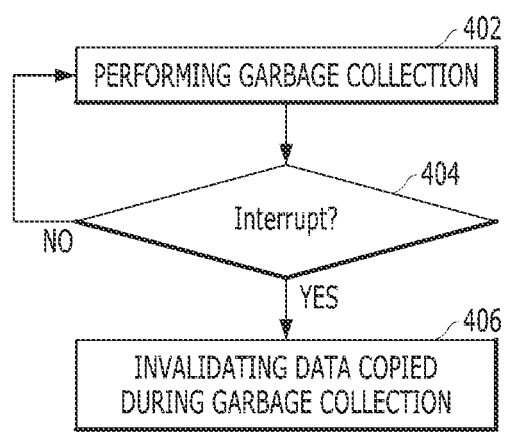
FIG. 6 illustrate a first example of a method for operating a memory system according to an embodiment of the present disclosure.

FIG. 6 illustrate a first example of a method for operating a memory system according to an embodiment of the present disclosure.

Referring to FIG. 6, a method for operating a memory system may include performing garbage collection (402) and monitoring an occurrence of an interrupt (404). When the garbage collection is stopped due to the interrupt (YES at 404), the memory system may perform invalidating data items copied during garbage collection (406). On the other hand, if the interrupt does not occur (NO at 404), the memory system may continue to perform the garbage collection (402).

According to an embodiment, the interrupt monitored by the memory system may include the sudden power off (SPO) described in FIG. 5. Specifically, some of the events that occur during an operation of the memory system may temporarily stop the garbage collection, but the interrupt illustrated in FIG. 6 may include an event capable of forcibly stopping or ending the garbage collection instead of temporarily holding the garbage collection.

In the memory system 110 according to an embodiment of the present disclosure, if a specific condition is satisfied while performing garbage collection, map data (e.g., L2P map table or L2P map data item) associated with valid data items whose location have changed in the memory device 150 can be renewed or updated. However, if the specific condition is not satisfied while performing garbage collection, the memory system 110 may not update the map data (e.g., L2P map table or L2P map data item) associated with valid data items whose location have changed in the memory device 150.

Referring to FIGS. 1 and 6, for the garbage collection, the memory system 110 can adjust or change an operation condition for updating map data in order to enhance, improve or maintain the performance of the memory system 110. For example, when the number of free blocks in the memory device 150 is greater than a preset reference (e.g., 10%, 5%, 2%, or 1% of the total memory blocks), or when the operating environment of the memory system 110 is stable (e.g., when repetitive sudden power off (SPO) does not occur), the memory system 110 may set the operation condition for updating the map data to reduce a write amplification factor (WAF). In order to reduce the write amplification factor (WAF), the memory system 110 may update the map data after copying valid data items included in the victim block to the target block.

On the other hand, when the number of free blocks in the memory device 150 is less than a preset reference or when the operating environment of the memory system 110 is unstable (for example, when a repetitive sudden power off (SPO) occurs, etc.), the memory system 110 can give a priority to securing a free block over exhausting the free block. To this end, even if valid data items included in the victim block are copied to the target block, the memory system 110 may update the map data after the target block is fully filled with valid data items. However, even if a valid data item is copied to the target block during the garbage collection, the memory system 110 might not perform an operation for updating the map data until the target block is fully filled with data items. That is, valid data items copied to the target block can be invalidated unless the target block is fully filled with data items.

Figure 7:
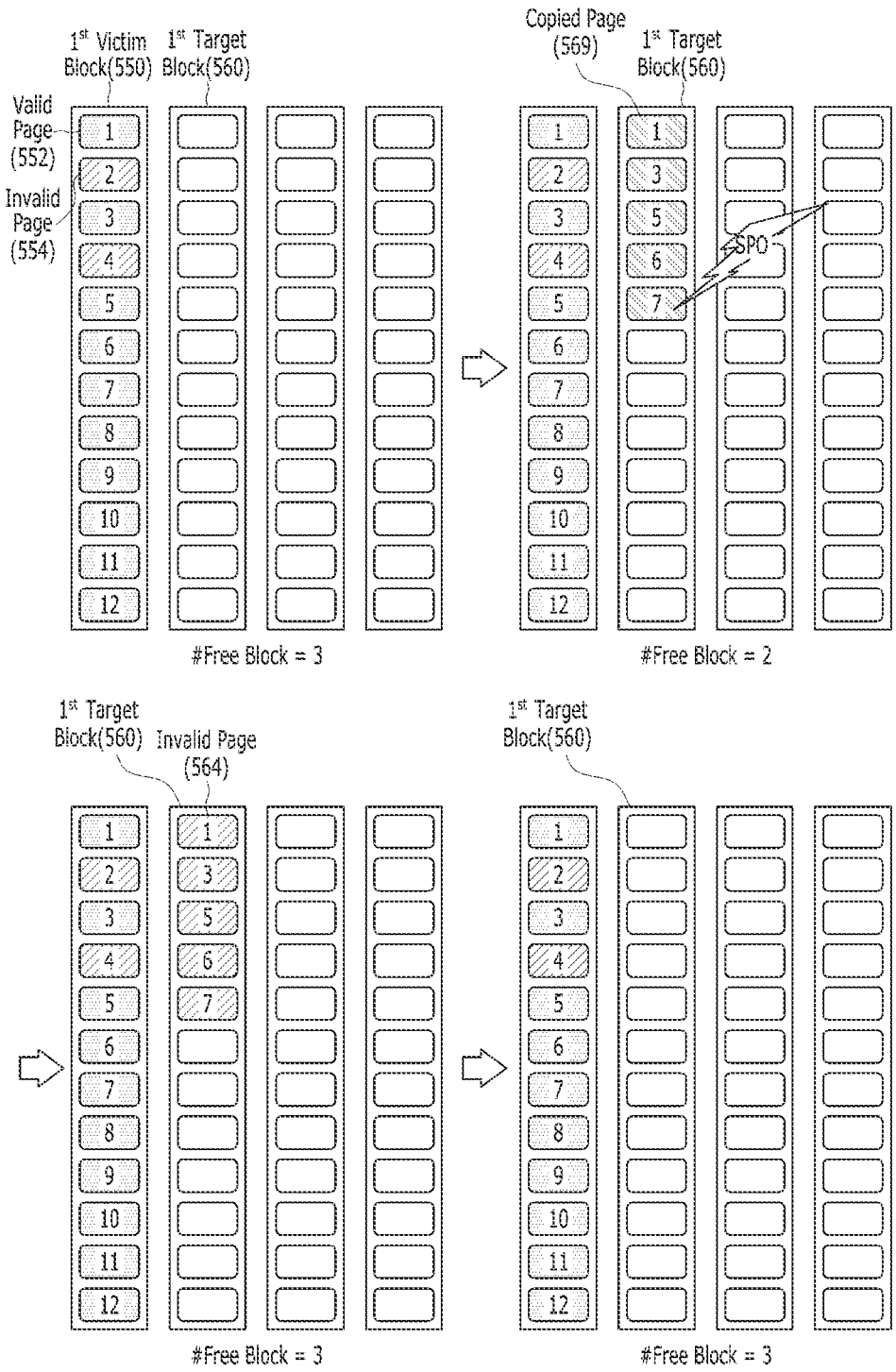
FIG. 7 illustrates an example of invalidating a data item copied during garbage collection according to an embodiment of the present disclosure.

FIG. 7 illustrates an example of invalidating a data item copied during garbage collection according to an embodiment of the present disclosure. Like FIG. 5, in FIG. 7, the memory device of the memory system includes four memory blocks, and 12 pages are included in each memory block. In addition, three of the four memory blocks are free blocks, and at least one valid data item and at least one invalid data item are included in one memory block.

Referring to FIG. 7, the memory system can perform garbage collection. The memory system can copy a valid data item included in a first victim block 550 to a first target block 560 which is selected from the free blocks. The first victim block 550 includes valid pages 552 in which valid data items are stored and invalid pages 554 in which invalid data items are stored. Because invalid data items remain in second and fourth pages (i.e., invalid pages 554) in the first victim block 550, the memory system can try to copy valid data items stored in the other 10 pages of the first victim block 550 to the first target block 560 during the garbage collection.

When a valid data item in the first victim block 550 is copied to the first target block 560, the number of free blocks in the memory device 150 is reduced from three to two. Valid data items in the first victim block 550 may be sequentially copied to the first target block 560. When the valid data items included in the valid pages 552 of the first victim block 550 are sequentially copied to the first target block 560, the copied pages 569 in the first target block 560 may increase. In FIG. 7, except for second and fourth pages 554 in the first victim block 550, the memory system 110 sequentially copies data items at the valid pages 552 of the first victim 550 to the first target block 560 during the garbage collection. As an example, when a valid data item stored in a seventh page is copied to the first target block 560, sudden power off (SPO) occurs.

When a sudden power-off (SPO) occurs, the garbage collection performed by the memory system 110 may be forcibly stopped. Unlike the example described in FIG. 5, the memory system described in FIG. 7 might not update map data associated with valid data items copied to the first target block 560 because the garbage collection is stopped but the first target block 560 is not yet fully filled with data items. Accordingly, all data items in copied pages 569 of the first target block 560 are regarded as invalid pages 564. Here, data items at the copied page 569 of the first target block 560 cannot be considered valid data items until map data associated with the data items is updated, so that the data items copied to the target block due to the garbage collection are not regarded as invalid data items as long as the map data is not updated. Because the first target block 560 includes only invalid pages 564 in which invalid data items are stored, the first target block 560 is not a memory block in use so that the first target block 560 can be regarded as a free block. Accordingly, the number of free blocks in the memory device 150 may increase from two to three. According to an embodiment, the memory system 110 may further perform an erase operation on the first target block 560 that does not include a valid data item.

As in the above-described method, at least one invalid data item may be included in a victim block. Accordingly, when the size of the victim block and the target block are the same, at least one free block (e.g., a memory block having no valid data item) may be secured before the target block is fully filled with copied data items. In an embodiment of the present disclosure, the operating condition for updating the map data associated with valid data items copied during the garbage collection or a timing of updating the map data is changed or adjusted. If the target block is not fully filled with copied data items (e.g., the operating condition is not satisfied), the copied valid data items are invalidated, so that the memory system 110 can prioritize securing rather than the consumption of free blocks in the memory device 150.

In an embodiment, before the first target block 560 is used again, the memory system 110 may check whether the first target block 560 has been erased and perform an erase operation on the first target block 560 based on a checking result. Accordingly, a data item invalidated in the first target block 560 might not interfere with another operation of the memory device 150 in the future.

Figure 8:
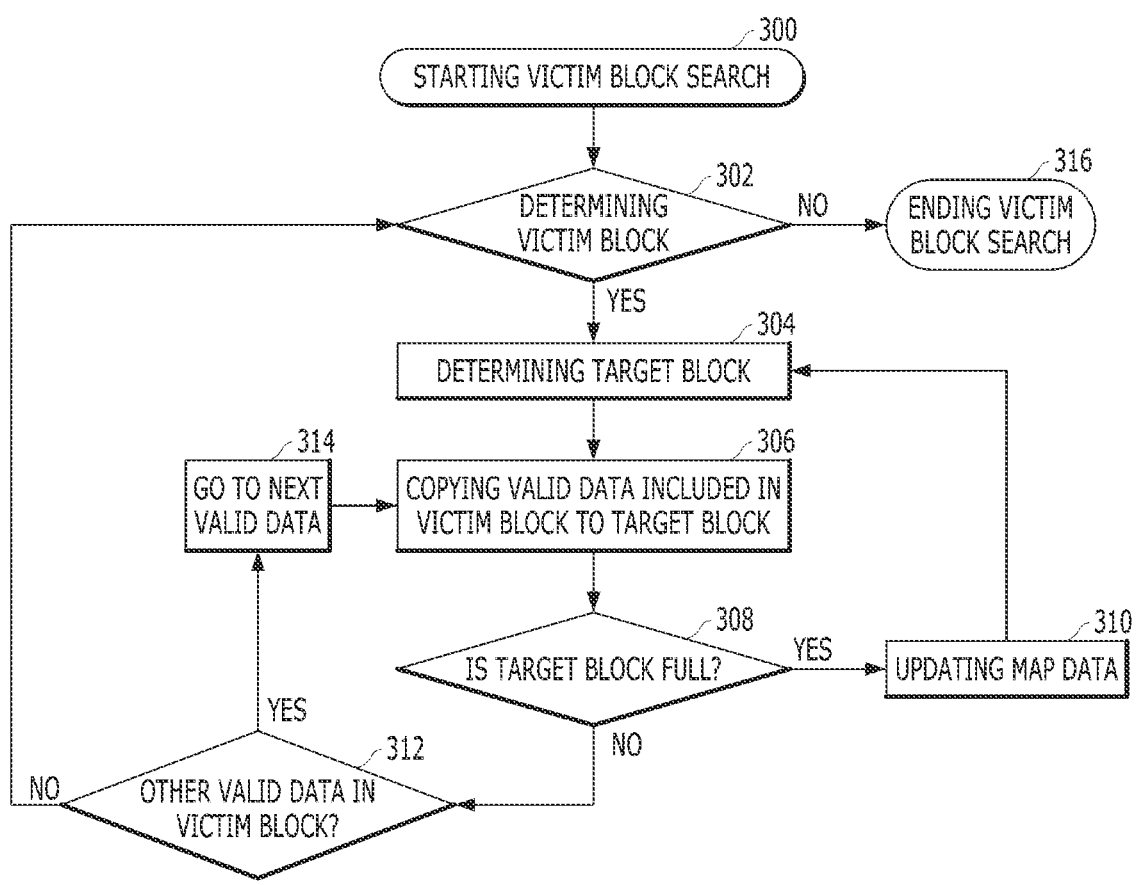
FIG. 8 illustrate a second example of a method for operating a memory system according to another embodiment of the present disclosure.

FIG. 8 illustrate a second example of a method for operating a memory system according to another embodiment of the present disclosure. Operations described in FIG. 8 may be included in garbage collection performed by the memory system 110.

Referring to FIG. 8, for the garbage collection, the memory system 110 may search for a victim block (300). In a process of searching for the victim block, the memory system 110 may use or check operation information about plural memory blocks in the memory device 150. For example, the operation information may include a valid page count or an invalid page count of each memory block.

Based on the operation information, the memory system 110 may determine at least one victim block (302). If there is no victim block that satisfies a preset condition for improving the performance of the memory system 110, the memory system 110 may end searching for a victim block (316). When it is determined that there are plural victim blocks satisfying the preset condition, the memory system 110 can perform the garbage collection on the plural victim blocks in a descending order of valid page count or an ascending order of invalid page count.

If the victim block is determined, the memory system 110 may determine a target block, to which a valid data item is copied from the victim block (304). The target block may be selected from one of free blocks included in the memory device 150. When the target block is determined, the memory system 110 may check whether the target block has been erased or perform an erase operation on the target block based on a checking result.

The memory system 110 may copy a valid data item included in the victim block to the target block (306). More specifically, the memory system 110 checks which page is a valid page in the victim block sequentially, referring to bitmap information indicating whether data items stored from the first page to the last page of the victim block are valid or invalid. Then, the memory system 110 can sequentially read valid data items from the victim block. The read data items can be sequentially programmed into the target block. The memory system 110 may generate a second map data item (e.g., P2L map data item) after programming the copied data item in the target block.

After copying the valid data item included in the victim block to the target block (306), the memory system 110 may determine whether the target block is fully filled with the copied data items (308). If the target block is fully filled with the copied data items (YES at 308), the memory system 110 may update map data (310). The updating of the map data may include updating a first map data item (e.g., L2P map data item) based on the second map data item (e.g., P2L map data item).

After updating the map data (310), the memory system 110 may determine a new target block for copying another valid data item (304).

When the target block is not fully filled with the copied data items (NO at step 308), the memory system 110 may check whether there is another valid data item included in the victim block (312). If there is no other valid data item included in the victim block (NO at 312), the memory system 110 may determine or select a new victim block (302).

When there is another valid data item in the victim block (YES at 312), the memory system moves to the next valid data item in the victim block (314). Thereafter, the memory system 110 may read a data item stored in the corresponding valid page and then program the read data item in the target block (306).

According to an embodiment, in the garbage collection described in FIG. 8, a single valid page in the victim block is read or a plurality of valid pages are successively read according to operational performance of the controller 130 or a storage capacity of the memory 144. Then, the memory system 110 can program a read data item at a single page of the target block or sequentially program plural read data items at plural pages of the target block.

As described above, the memory system 110 according to an embodiment can determine when to update the map data based on whether the target block is fully filled with the copied data items read from at least one victim block, not whether all valid data items of a victim block have been copied to the target block.

FIG. 9 illustrates an example of garbage collection performed by a memory system according to an embodiment of the present disclosure. In FIG. 9, a memory device of the memory system includes five memory blocks, and 12 pages are included in each memory block. In addition, three of the five memory blocks are free blocks, and at least one valid data item and at least one invalid data item are included in two of the five memory blocks.

Referring to FIG. 9, during garbage collection, the memory system 110 can try to copy valid data items included in a first victim block 550 and a second victim block 570 to a target block. The first victim block 550 and the second victim block 570 may include at least one valid page 552 in which a valid data item is stored and at least one invalid page 554 in which an invalid data item is stored, individually. The valid page 552 (e.g., the first page of the second victim memory block 570) and the invalid page 554 (e.g., the last page of the second victim memory block 570) are differently marked in FIG. 9. The memory system 110 may select one of the three free blocks as a first target block 560.

When data items stored at 10 valid pages included in the first victim block 550 are copied to the first target block 560, the number of free blocks in the memory device 150 is reduced from three to two. After copying all data items stored in the 10 valid pages included in the first victim block 550 to the first target block 560, other data items stored in valid pages included in the second victim block 570 can be sequentially copied to the first target block 560. When the data items stored in the 10 valid pages of the first victim block 550 and the data items stored in two valid pages of the second victim block 570 are copied to the first target block 560, the first target Block 560 may be fully filled with the copied data items.

When the first target block 560 is fully filled with the copied data items, the memory system 110 may update map data associated with the data items copied to the first target block 560. Here, the updating of the map data may include an operation for updating a first map data item or a first map table (e.g., L2P map data item or L2P map table) based on the second map data items or a second map table (e.g., P2L map data item or P2L map table). After the memory system 110 updates the map data, any valid data item no longer remains in the first victim block 550. Because any valid data no longer remains in the first victim block 550, the first victim bock 550 may be regarded as a free block. Accordingly, the number of free blocks in the memory device 150 may be increased from two to three through the updating of the map data. According to an embodiment, the memory system 110 may perform an erase operation on the first victim block 550 that does not include any valid data item.

Here the size of the victim block and the target block are the same. Because a victim memory block includes valid and invalid pages, no more valid data item remains in at least one victim block when the target block is fully filled with the copied data items. Accordingly, when the garbage collection is performed, the memory system 110 can maintain or increase the number of free blocks. In addition, even if the garbage collection is stopped by an interrupt, the memory system can invalidate a valid data item copied to the target block, thus avoiding a situation in which a free block is consumed but not secured in the memory device.

According to an embodiment of the present disclosure, a memory system can prioritize an operation for securing a free memory block in the memory device over free memory exhaustion, so that the memory system may avoid becoming a stuck status because a free memory block is not secured in the memory system by an interrupt.

In addition, a memory system according to an embodiment of the present disclosure can have an advantage of stably securing a free memory block because an operational mechanism of garbage collection can be adjusted or modified according to an operating condition or environment of a non-volatile memory device.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A memory system, comprising:
a memory device including plural memory blocks; and
a controller configured to perform garbage collection on a victim block among the plural memory blocks,
wherein the controller is further configured to:
stop the garbage collection in response to an interrupt, and
invalidate a valid data item, which was copied from the victim block to a target block during the garbage collection, so that the target block where the valid data item was invalidated is regarded as a free block based on whether a number of free blocks among the plural memory blocks is less than a preset reference.

2. The memory system according to claim 1, wherein the interrupt is caused by a sudden power off.

3. The memory system according to claim 1, wherein the controller is further configured to monitor the number of free blocks among the plural memory blocks in the memory device.

4. The memory system according to claim 1, wherein the controller invalidates the valid data item copied during the garbage collection when the number of free blocks among the plural memory block is less than the preset reference, and updates map data associated with the valid data item when the number of free block is greater than or equal to the preset reference.

5. The memory system according to claim 1,
wherein the controller performs the garbage collection by selecting the victim block among the plural memory blocks, selecting the target block among the plural memory blocks and copying the valid data item from the victim block to the target block, and
wherein the controller is further configured to update a map data item associated with the valid data item when the target block is fully filled with data items.

6. The memory system according to claim 5,
wherein the controller is further configured to add a first map data item into a first map table after copying the valid data item to the target block,
wherein the controller updates the map data item associated with the valid data item by updating a second map table based on the first map table when the target block is fully filled with the data items, and
wherein the first map item associates a physical address with a logical address and the second map table includes a second map item associating the logical address with the physical address.

7. The memory system according to claim 6,
wherein the controller is further configured to temporarily store the first map table in a volatile memory and store the second map table in the memory device, and
wherein the controller invalidates the valid data item by skipping the updating of the second map table based on the first map table when the garbage collection is stopped due to the interrupt before the target block is fully filled with the data items.

8. The memory system according to claim 5, wherein the controller is configured to:
check whether the target block is erased after selecting the target block, and
perform an erase operation on the target block based on a result of the checking.

9. The memory system according to claim 1, wherein the controller is further configured to perform the garbage collection on the victim block again when the memory system becomes operatable.

10. A method for operating a memory system, comprising:
determining a victim block among plural memory blocks in a memory device;
determining a target block among the plural memory blocks;
copying a valid data item from the victim block to the target block; and
stopping the copying and invalidating the valid data item copied to the target block, in response to an interrupt, so that the target block where the valid data item was invalidated is regarded as a free block based on whether a number of free blocks among the plural memory blocks is less than a preset reference.

11. The method according to claim 10, wherein the interrupt is caused by a sudden power off.

12. The method according to claim 10, further comprising monitoring the number of free blocks among the plural memory blocks in the memory device.

13. The method according to claim 10, wherein the stopping the copying and invalidating the valid data item comprises:
invalidating the valid data item copied from the victim block to the target block when the number of free blocks among the plural memory block is less than a preset reference; and
updating map data associated with the valid data item when the number of free block is greater than or equal to the preset reference.

14. The method according to claim 10, further comprising updating a map data item associated with the valid data item when the target block is fully filled with data items.

15. The method according to claim 14,
further comprising adding a first map data item into a first map table after copying the valid data item to the target block,
wherein the updating the map data item associated with the valid data item includes updating a second map table based on the first map table when the target block is fully filled with the data items, and wherein the first map item associates a physical address with a logical address and the second map table includes a second map item associating the logical address with the physical address.

16. The method according to claim 15,
further comprising temporarily storing the first map table in a volatile memory and storing the second map table in the memory device, and
wherein the invalidating the valid data item includes skipping the updating of the second map table based on the first map table when the garbage collection is stopped due to the interrupt before the target block is fully filled with the data items.

17. The method according to claim 10, further comprising:
checking whether the target block is erased after selecting the target block; and
performing an erase operation on the target block based on a result of the checking.

18. The method according to claim 10, further comprising performing the garbage collection on the victim block again when the memory system becomes operatable.

19. A controller coupled via at least one data path to a memory device including plural memory blocks and comprising at least one processor, at least one memory, and a logic, at least a portion of the logic comprised in hardware,
wherein the logic is configured to:
determine a victim block and a target block among the plural memory blocks;
copy a valid data item from the victim block to the target block; and
stop the copying of the valid data item and invalidate the valid data item copied to the target block, in response to an interrupt, so that the target block where the valid data item was invalidated is regarded as a free block based on whether a number of free blocks among the plural memory blocks is less than a preset reference.

20. The controller according to claim 19,
wherein the logic is further configured to temporarily store a first map table in a volatile memory and store a second map table in the memory device,
wherein the logic invalidates the valid data item by skipping an operation of updating the second map table based on the first map table when the copying is stopped due to the interrupt before the target block is fully filled with data items, and
wherein the controller invalidates the valid data item copied during the garbage collection when the number of free blocks among the plural memory block is less than the preset reference, and updates map data associated with the valid data item when the number of free block is greater than or equal to the preset reference.

* * * * *